(12) United States Patent
Hagiwara et al.

(10) Patent No.: US 7,372,046 B2
(45) Date of Patent: May 13, 2008

(54) RADIATION IMAGE CONVERSION PANEL

(75) Inventors: Kiyoshi Hagiwara, Hino (JP); Hideaki Wakamatsu, Hino (JP); Natsuki Ito, Hino (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 11/576,392

(22) PCT Filed: Sep. 29, 2005

(86) PCT No.: PCT/JP2005/017946

§ 371 (c)(1),
(2), (4) Date: May 4, 2007

(87) PCT Pub. No.: WO2006/038514

PCT Pub. Date: Apr. 13, 2006

(65) Prior Publication Data

US 2007/0246661 A1    Oct. 25, 2007

(30) Foreign Application Priority Data

Oct. 4, 2004  (JP) .............................. 2004-291133

(51) Int. Cl.
*H05B 33/00* (2006.01)

(52) U.S. Cl. .................................................. 250/484.4

(58) Field of Classification Search ............. 250/484.4
See application file for complete search history.

(56) References Cited

U.S. PATENT DOCUMENTS

| 6,344,657 B1* | 2/2002 | Matsumoto et al. ......... 250/588 |
| 2003/0160186 A1* | 8/2003 | Van den Bergh et al. ............. 250/484.4 |
| 2007/0246661 A1* | 10/2007 | Hagiwara et al. ........ 250/484.4 |

* cited by examiner

*Primary Examiner*—Dave Porta
*Assistant Examiner*—Marcus H Taningco
(74) *Attorney, Agent, or Firm*—Lucas & Mercanti, LLP

(57) ABSTRACT

An objective is to provide a radiation image conversion panel exhibiting excellent graininess and reduced x-ray damage (luminance degradation). A radiation image conversion panel comprising a support and provided thereon, a stimulable phosphor layer containing a stimulable phosphor in a polymer resin, wherein a luminescence intensity ratio of (A) stimulable phosphor particles comprising a smallest average particle diameter to (B) stimulable phosphor particles comprising a largest average particle diameter is 0.8-1.2, provided that a total average particle diameter of all the stimulable phosphor particles is 3.0-10.0 μm, an average particle diameter of (A) is 2.0-6.0 μm, an average particle diameter of (B) is 6-15 μm, and a content of (A) or (B) is within the range of at least 10% by weight and at most 90% by weight, based on the total stimulable phosphor content.

5 Claims, No Drawings

RADIATION IMAGE CONVERSION PANEL

TECHNICAL FIELD

The present invention relates to a radiation image conversion panel.

BACKGROUND

As an effective means for replacing conventional radiography known is a recording and reproducing method of radiation images using stimulable phosphors described in Japanese Patent O.P.I. Publication No. 55-12148. In the method, a radiographic image conversion panel (hereinafter, also simply denoted as panel) comprising a stimulable phosphor is employed, and the method comprises the steps of causing the stimulable phosphor of the panel to absorb radiation having passed through an object or having been radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photo-electrically detecting the emitted light to obtain electrical signals, and reproducing the radiation image of the object as a visible image from the electrical signals. The panel, having been read out, is then subjected to image-erasing and prepared for the next photographing cycle. Thus, the radiographic image conversion panel can be used repeatedly.

In the radiation image recording and reproducing methods described above, a radiation image is advantageously obtained with a sufficient amount of information by applying radiation to an object at a considerably smaller dose, as compared to conventional radiography employing a combination of a radiographic film and a radiographic intensifying screen. Further, in conventional radiography, the radiographic film is consumed for every photographing; on the other hand, in this radiation image converting method, in which the radiographic image conversion panel is employed repeatedly, is also advantageous in terms of conservation of resources and overall economic efficiency.

The radiation image conversion panel employed in the radiation image recording and reproducing method basically comprises a support and provided thereon, a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiation image conversion panel in which a polymeric material is contained in the openings among the aggregated stimulable phosphor. On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

The stimulable phosphor, after being exposed to radiation, produces stimulated emission upon exposure to the stimulating ray. In practical use, phosphors are employed, which exhibit an emission within a wavelength region of 300 to 500 nm stimulated by stimulating light of wavelengths of 400 to 900 nm. Examples of such stimulable phosphors include rare earth activated alkaline earth metal fluorohalide phosphors described in Japanese Patent O.P.I. Publication Nos. 55-12145, 55-160078, 56-74175, 56-116777, 57-23673, 57-23675, 58-206678, 59-27289, 59-27980, 59-56479 and 59-56480; divalent europium activated alkaline earth metal fluorohalide phosphors described in Japanese Patent O.P.I. Publication Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in Japanese Patent O.P.I. Publication No. 59-12144; cerium activated trivalent metal oxyhalide phosphors described in Japanese Patent O.P.I. Publication No. 55-69281; bismuth activated alkaline metal halide phosphors described in Japanese Patent O.P.I. Publication No. 60-70484; divalent europium activated alkaline earth metal halophosphate phosphors described in Japanese Patent O.P.I. Publication Nos. 60-141783 and 60-157100; divalent europium activated alkaline earth metal haloborate phosphors described in Japanese Patent O.P.I. Publication No. 60-157099; divalent europium activated alkaline earth metal hydrogenated halide phosphors described in Japanese Patent O.P.I. Publication No. 60-217354; cerium activated rare earth complex halide phosphors described in Japanese Patent O.P.I. Publication Nos. 61-21173 and 61-21182; cerium activated rare earth halophosphate phosphors described in Japanese Patent O.P.I. Publication No. 61-40390; divalent europium activated cesium rubidium halide phosphors described in Japanese Patent O.P.I. Publication No. 60-78151; divalent europium activated cerium halide rubidium phosphors described in Japanese Patent O.P.I. Publication No. 60-78151; divalent europium activated composite halide phosphors described in Japanese Patent O.P.I. Publication No. 60-78153. Specifically, iodide-containing divalent europium activated alkaline earth metal fluorohalide phosphors, iodide containing rare earth metal activated oxyhalide phosphors and iodide containing bismuth activated alkaline earth metal halide phosphors exhibited stimulated emission of high luminance.

Along with the spread of radiation image conversion panels employing stimulable phosphors is further desired an enhancement of radiation image quality, such as enhancement in sharpness and graininess.

The foregoing preparation methods of stimulable phosphors are called a solid phase process or calcination method, in which pulverization after calcination is indispensable, however, there were problems such that it was difficult to control the particle form affecting sensitivity and image performance. Of means for enhancing image quality of radiation images is valid preparation of fine particles of a stimulable phosphor and enhancing particle size uniformity of the fine stimulable phosphor particles, i.e., narrowing the particle size distribution.

Preparation of stimulable phosphors in the liquid phase described in Japanese Patent O.P.I. Publication Nos. 7-233369 and 9-291278 is a method of obtaining a stimulable phosphor precursor in the form of fine particles by adjusting the concentration of a phosphor raw material solution, which is valid as a method of preparing stimulable phosphor powder having a narrow particle size distribution.

Of rare earth activated alkaline earth metal fluorohalide stimulable phosphors, a phosphor having higher iodide content is preferred in terms of reduction of radiation exposure. This is due to the fact that iodine exhibits a higher X-ray absorption than bromine.

Radiation image conversion panels are excellent in view of the resource conservation and economic efficiency, since they can be repeatedly operated, but it is known that stimulable phosphors in the radiation image conversion panels tend to be damaged when the radiation image conversion panels are repeatedly exposed to X-ray for a long duration.

This so-called X-ray damage is caused by luminance degradation generated via damage of the stimulable phosphor substance itself affecting the stimulated luminescence intensity. Therefore, radiation image conversion panels exhibiting reduced X-ray damage (luminance degradation) together with improved stimulated luminescence, erasing characteristics and graininess are demanded specifically for radiation image conversion panels repeatedly operated for a long duration.

(Patent Document 1) Japanese Patent O.P.I. 2001-11440

DISCLOSURE OF THE INVENTION

Accordingly, it is an object of the present invention to provide a radiation image conversion panel exhibiting excellent properties including excellent graininess and luminance degradation resistance.

The foregoing object can be accomplished by the following structures.

(Structure 1) A radiation image conversion panel comprising a support and provided thereon, a stimulable phosphor layer containing a stimulable phosphor in a polymer resin, wherein a luminescence intensity ratio of stimulable phosphor particles comprising a smallest average particle diameter to stimulable phosphor particles comprising a largest average particle diameter is 0.8-1.2, provided that a total average particle diameter of all the stimulable phosphor particles is 3.0-10.0 μm, an average particle diameter of the stimulable phosphor particles comprising a smallest average particle diameter is 2.0-6.0 μm, an average particle diameter of the stimulable phosphor particles comprising a largest average particle diameter is 6-15 μm, and a content of the stimulable phosphor particles comprising a smallest average particle diameter or the stimulable phosphor particles comprising a largest average particle diameter is within the range of at least 10% by weight and at most 90% by weight, based on the total stimulable phosphor content.

(Structure 2) The radiation image conversion panel of Structure 1, wherein a content of Sr in the stimulable phosphor particles comprising a largest average particle diameter is 0.1-30 ppm, and a content of Sr in the stimulable phosphor comprising a smallest average particle diameter is 50-200 ppm.

(Structure 3) The radiation image conversion panel of Structure 1, wherein the stimulable phosphor layer comprises a mixture of two kinds of the stimulable phosphor particles having large average particle diameters and the stimulable phosphor particles having small average particle diameters.

(Structure 4) The radiation image conversion panel of Structure 2, wherein the stimulable phosphor layer comprises a mixture of two kinds of the stimulable phosphor particles having large average particle diameters and the stimulable phosphor particles having small average particle diameters.

(Structure 5) The radiation image conversion panel of Structure 1 comprising the stimulable phosphor represented by the following Formula (1).

$$Ba_{1-x}M^2_xFBr_yI_{1-y}:aM^1,bLn,cO \qquad \text{Formula (1)}$$

where $M^1$ is at least one alkali metal atom selected from the group consisting of Li, Na, K, Rb and Cs; $M^2$ is at least one alkaline earth metal atom selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and $0 \leq x \leq 0.3$, $0 \leq y \leq 0.3$, $0 \leq a \leq 0.05$, $0 < b \leq 0.2$ and $0 < c \leq 0.1$.

DESCRIPTION OF THE PREFERRED EMBODIMENTS

Next, the present invention is further described in detail.

It is a feature in the present invention that disclosed is a radiation image conversion panel comprising a support and provided thereon, a stimulable phosphor layer containing a stimulable phosphor in a polymer resin, wherein a luminescence intensity ratio of stimulable phosphor particles comprising a smallest average particle diameter to stimulable phosphor particles comprising a largest average particle diameter is 0.8-1.2, provided that a total average particle diameter of all the stimulable phosphor particles is 3.0-10.0 μm, an average particle diameter of the stimulable phosphor particles comprising a smallest average particle diameter is 2.0-6.0 μm, an average particle diameter of the stimulable phosphor particles comprising a largest average particle diameter is 6-15 μm, and a content of the stimulable phosphor particles comprising a smallest average particle diameter or the stimulable phosphor particles comprising a largest average particle diameter is within the range of at least 10% by weight and at most 90% by weight, based on the total stimulable phosphor content, for the purpose of obtaining a radiation image conversion panel exhibiting excellent graininess and reduced x-ray damage (luminance degradation). Further, in order to improve graininess, it is preferred that filling density of particles is increased. Luminescence of particles in the stimulable phosphor layer is uniformized when the filling density is increased, and graininess is considered to be improved. To mix particles having different particle diameters, as a preferable means, increases the filling density of particles, whereby graininess can be improved. Since a small particle is penetrated into a gap between large particles, a filling factor is increased in comparison to particles having only an even particle diameter, and graininess is improved.

In order to adjust an average particle diameter of the above-described phosphor, the average particle diameter can be adjusted by those such as a concentration speed and concentration time during particle formation via crystallization, an addition speed of ammonium fluoride, adjustment of reaction temperature, air classification after particle formation, and so forth.

The above-described luminescence intensity ratio of two kinds of particles being 0.8-1.2 can be achieved by adjusting the content of Eu and Sr activators.

Further, it is preferable in view of the effect of the present invention specifically such as reduced luminance degradation that the content of Sr in the foregoing stimulable phosphor comprising the smallest average particle diameter is adjusted to 50-200 ppm, and a content of Sr in the foregoing stimulable phosphor comprising the largest average particle diameter is adjusted to 0.1-30 ppm.

The content of Sr in the stimulable phosphor being set to the above-described value can be achieved by adjusting the addition amount of strontium halide during particle formation via crystallization.

It is preferable in the present invention that a surface treatment is conducted to the surface of phosphor particles after calcination employing the following silane coupling agent.

Various phosphors can be utilized as a stimulable phosphor of the present invention, but it is preferable that a rare-earth-activated alkali-earth-metal fluoride halide stimulable phosphor (stimulable phosphor) represented by the following Formula (1) is employed in the present invention.

$$Ba_{1-x}M^2_xFBr_yI_{1-y}:aM^1,bLn,cO \qquad \text{Formula (1)}$$

where $M^1$ is at least one alkali metal atom selected from the group consisting of Li, Na, K, Rb and Cs; $M^2$ is at least one alkaline earth metal atom selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and $0 \leq x \leq 0.3$, $0 \leq y \leq 0.3$, $0 \leq a \leq 0.05$, $0 < b \leq 0.2$ and $0 < c \leq 0.1$.

A liquid phase method is preferable to prepare a stimulable phosphor precursor of the present invention.

Preferably applicable are the liquid phase method to prepare a stimulable phosphor precursor, described in Japanese Patent O.P.I. Publication No. 10-140148 and the apparatus for preparing a phosphor precursor by the liquid phase method, described in Japanese Patent O.P.I. Publication No. 10-147778. The stimulable phosphor precursor means one being in the state at which a material represented by foregoing Formula (I) has not yet been subjected to a temperature of at least 600° C. and the stimulable phosphor precursor produces neither stimulated luminescence nor instantaneous luminescence. In the present invention, the precursor is preferably prepared by the following liquid phase synthesis.

Preparation Method:

Thus, the method comprises the steps of: preparing a reaction mother liquid containing $BaI_2$ preferably at a concentration of at least 3.3 mol/liter (more preferably, at least 3.5 mol/liter) and a halide of Ln, provided that when "x" in Formula (I) is not zero, the mother liquid further contains a halide of $M^2$ and when "y" in Formula (I) is not zero, the mother liquid further contains $BaBr_2$ and a halide of $M^1$; adding a reducing agent into the reaction mother liquid; adding an aqueous solution containing preferably at least 5 mol/liter (more preferably at least 8 mol/liter) of inorganic fluoride (ammonium fluoride or alkali metal fluoride) into the mother liquid while maintaining the above-described reaction mother liquid preferably at a temperature of at least 50° C., or more preferably at a temperature of at least 80° C. to form a crystalline precipitate of a rare earth activated alkaline earth metal fluorohalide stimulable phosphor precursor; removing a solvent from the reaction mother liquid while adding the above-described inorganic fluoride; separating the crystalline precipitate of the precursor from the mother liquid; and calcinating the separated precursor precipitate while avoiding sintering.

From electron micrograph of phosphor particles (crystals), 200 particles were selected at random to determine an average particle diameter as a volume-based particle diameter via sphere-conversion. The value which is a diameter converted as a sphere equivalent diameter is a mean value obtained from a third root of $(6V/\pi)$ resulting in

after calculating Volume (V) of each particle. In addition, the micrographs were taken employing a scanning electron microscope (SEM, an accelerating voltage of 10 kV) S-800, manufactured by Hitachi Limited.

Examples of the reducing agent usable in the present invention include a hypophosphorous acid (acid salt), phosphate, hydrazine, a hydrazine derivative and so forth.

Further, the reducing agent of the present invention in the reaction mother liquid preferably has a concentration of 1-1000 ppm.

Next, a method of producing the stimulable phosphor will be explained.

(Preparation of Precursor Crystal Precipitate and Stimulable Phosphor)

First, raw material compounds excluding fluorine compounds are dissolved in a water-based medium. In other words, a reducing agent ($BaI_2$), halide of rare-earth element (Ln), halide of alkali earth metal (M2) if necessary, and halide of alkali metal (M1) were fully mixed in a water-based medium to dissolve. Here it is necessary to control the concentration of $BaI_2$ and the quantity of water-based medium in advance so that the concentration of $BaI_2$ may be preferably at least 3.3 moles/liter or more preferably at least 3.5 moles/liter. In this case, if the barium halide concentration is low, a precursor of the expected composition cannot be obtained or the particles may be greater than expected. Therefore, the barium halide concentration must be selected adequately. After a careful study and research, we, inventors, found that the barium concentration of preferably at least 3.3 moles/liter or more can form fine precursor particles. It is possible to add a little acid, ammonia, alcohol, water-soluble high polymer, and fine power of water-insoluble metal oxide if necessary.

In addition, the concentration of $BaI_2$ is preferably 3.3-5.0 moles/liter.

Further, it is also preferable to add an adequate quantity of lower alcohol (methanol or ethanol) to the solution so as not to largely reduce the solubility of $BaI_2$. This aqueous solution (or the reaction mother liquid) is kept at 80° C.

Next, an aqueous solution of inorganic fluoride (such as ammonium fluoride and fluoride of alkali metal) is added to the above aqueous solution (reaction mother liquid) which is stirred continuously at 80° C. It is preferable to add the inorganic fluoride solution to a solution part which is stirred vigorously. The rare-earth-activated alkali-earth-metal fluoride halide phosphor precursor (hereinafter, referred to also as phosphor precursor) of foregoing formula (1) is produced by this addition of the inorganic fluoride solution to the reaction mother liquid and precipitates as crystals.

It is a feature in the present invention that a process of removing a solvent from the reaction liquid phosphor is conducted in parallel with the process of producing the precipitate of phosphor precursor crystals by adding the inorganic fluoride solution to the reaction mother liquid.

The process of removing the solvent from the reaction liquid can be conducted any time while the aqueous solution of inorganic fluoride is added to the reaction liquid. It is preferable that a ratio of the entire solution weight after solvent removal to the weight before solvent removal (or the sum of the weight of the reaction mother liquid and the weight of the added aqueous solution) does not exceed 0.97. (This ratio is called a solvent removal ratio.) If this ratio is less than 0.97, BaFI may not fully grow up into crystals. Therefore the ratio should preferably be at most 0.97 and more preferably at most 0.95. If the solvent is removed too much, the reaction solution becomes too viscous to be handled easily.

Accordingly, the preferable solvent removal ratio is down to 0.5. Further, since a time period required for solvent removal greatly affects the productivity of the stimulable phosphor and the solvent removing method will affect the shape and size distribution of resulting particles, an adequate solvent removing must be selected. A general method of removing a solvent from an aqueous solution is heating the solution to evaporate the solvent. This method is also available to the present invention. The solvent removal facilitates preparation of a precursor of expected compositions. It is preferable to use the other solvent removing method to increase the productivity and to shape particles adequately. In this case, any solvent and method can be used. It is also possible to use a method of using a separation membrane such as a reverse osmosis membrane. Judging from the productivity, the present invention preferably uses a solvent removing method below.

1. Dry Gas Aeration

In a closed reaction vessel, at least two openings are provided, through which dry gas is allowed to pass. Any gas is optionally selected but common air or nitrogen is preferred in terms of safety. The solvent is removed concomitantly with the aerating gas, depending on the saturated water vapor content in the gas. Besides permeating through openings in the reaction vessel, it is useful to allow the gas to bubble through a liquid phase to cause the solvent to be absorbed into the bubbles.

2. Evacuation

As is well known, vapor pressure is lowered by evacuation. Thus, a solvent is efficiently removed under reduced pressure. The extent of the reduced pressure is optimally selected, depending on the kind of solvent. In cases where water is used as a solvent, for example, the reduced pressure is preferably at most 86 kPa.

3. Liquid Membrane

Removal of a solvent can be efficiently effected by enlarging the vaporization area. In cases when undergoing reaction by heating with stirring in a reaction vessel of a given volume, heating is generally done in such a manner that a heating means is immersed into the liquid or is provided outside the vessel. In this case, the heat transfer area is limited to the portion of the heating means in contact with the liquid, so that the heat transfer area decreases with removal of the solvent, retarding removal of the solvent. To prevent such retardation, using a pump or a stirrer, the reaction solution is sprayed onto the wall of the reaction vessel to increase the heat transfer area. This method of spraying liquid onto the wall of the reaction vessel to form a liquid membrane is known as a wetted wall method. The wetted wall can be formed not only using a pump but also using a stirrer described in Japanese Patent O.P.I. Publication Nos. 6-335627 and 11-235522.

These methods are employed alone or in combination. Examples thereof include the combination of the formation of the wetted wall and maintaining the reaction vessel under the reduced pressure and the combination of the formation of the wetted wall and dry gas aeration. Of these, the former is preferred, as described in Japanese Patent O.P.I. Publication Nos. 6-335627 and 2002-35202.

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Then, this method puts the phosphor precursor crystals in a heat-resistant vessel such as a quartz boat, alumina crucible, or quartz crucible, puts the heat-resistant vessel in the center of an electric furnace, and calcinates the phosphor precursor crystals without sintering. The calcinating temperature should preferably 400-1,300° C. and more preferably 500-1,000° C. The calcinating time is dependent upon the quantity of the phosphor precursor crystals in the boat or crucible, the calcinating temperature, and take-up temperature, but it is preferably 0.5-12 hours.

The gas atmosphere in the furnace for calcinations can be a neutral gas atmosphere (such as nitrogen gas atmosphere and argon gas atmosphere), a weak-reducing atmosphere (such as a nitrogen gas atmosphere containing a little hydrogen gas and a carbon dioxide gas atmosphere containing carbon monoxide), or an atmosphere containing a trace of oxygen. A preferable calcination method is disclosed by Japanese Patent O.P.I. Publication No. 2000-8034. The above calcinations finish the target stimulable phosphor of rare-earth-activated alkali earth metal fluoride halide. A radiation image conversion panel is produced which contains a phosphor layer formed using this stimulable phosphor.

A commonly known method is usable as a surface treatment method.

There are known, for example, a dry method in which a silane coupling agent is dropwise added or sprayed onto phosphor particles with stirring by a Henschel mixer; a slurry method in which a silane coupling agent is dropwise added to slurry-form phosphor particles with stirring and after completion of the addition, the phosphor is allowed to precipitate and filtered, and then dried to remove remaining solvent; a method in which a phosphor is dispersed in a solvent and after adding a silane coupling agent thereto with stirring, the solvent is evaporated to form a deposited layer; and a method of adding a silane coupling agent to a coating dispersion of a stimulable phosphor. However, the present invention is not limited thereto.

Drying of the silane coupling agent is carried out preferably at a temperature of 60-130° C. for 10-200 min. to definitely undergo the reaction.

Further, examples of such the surface treatment include a method in which phosphor particles, immediately after calcination, are pulverized in a dispersion solution of particles and a silane coupling agent to conduct a pulverization treatment of the phosphor, a coating treatment of particles and a surface treatment with a silane coupling agent at the same time, followed by filtration and drying; and a method in which particles and a silane coupling agent are added to a coating liquid of a stimulable phosphor layer. However, the present invention is not limited thereto.

Specific examples of the silane coupling agent include methyltrimethoxysilane, methyltriethoxysilane, vinyltriacetoxysilane, vinyltrichlorosilane, vinyltriethoxysilane, γ-chloropropyltrimethoxysilane, γ-chloropropylmethyldichlorosilane, γ-chloropropylmethyldimethoxysilane, γ-chloropropylmethyldiethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane, γ-mercaptopropylmethyldimethoxysilane, γ-glycidoxypropyltrimethoxysilane, γ-methacryloxypropyltrimethoxysilane, γ-methacryloxypropylmethyldimethoxysilane, γ-(2-aminoethyl)-aminopropyltrimethoxysilane, γ-isocyanatepropyltriethoxysilane, γ-(2-aminoethyl)aminopropylmethyldimethoxysilane, γ-anilinopropyltrimethoxysilane, vinyltrimethoxysilane, and N-β-(N-vinylbenzylaminoethyl)-γ-aminopropyltrimethoxysilane. hydrochloric acid salt or aminosilane composite. Of these, vinyl type, mercapto type, glycidoxy type and methacryloxy type are preferred.

Next, the phosphor is classified to adjust an average particle diameter and to remove fine and coarse particles. A (curvature) air classifier described in Japanese Patent O.P.I. 2004-187589 in addition to a sieve and a centrifugal classifier is usable to classify the phosphor.

The radiation image conversion panel uses various kinds of polymer materials for its support. Particularly the materials are preferable if they can be processed into flexible sheet or web that can be used as information recording material. Judging from this, preferable films are cellulose acetate, polyester, polyethylene terephthalate, polyethylene naphthalate, polyamide, polyimide, triacetate, and polycarbonate films.

The thickness of the support layer is dependent upon the material of the support but generally it is 80-1,000 μm and more preferably 80-500 μm for convenience in handling. The surface of the support can be smooth or matted to increase the adhesion of the support to the stimulable phosphor layer.

The support may have an undercoat layer to increase the adhesion between the support and the stimulable phosphor layer.

The undercoat layer of the present invention should preferably contain a crosslinkable polymer resin and its crosslinking agent.

Any polymer resin can be used for the undercoat layer. It can be, for example, polyurethane, polyester, vinyl chloride copolymer, vinyl chloride-vinyl acetate copolymer, vinyl chloride-vinylidene chloride copolymer, vinyl chloride acrylonitrile copolymer, butadiene-acrylonitrile copolymer, polyamide resin, polyvinyl butyral, cellulose derivative (such as nitrocellulose), styrene-butadiene copolymer, a variety of synthetic rubber resins, phenol resin, epoxy resin, urea resin, melamine resin, phenoxy resin, silicone resin, acrylic resin, urea formamide resin, and so on. Among them, polyurethane, polyester, vinyl chloride copolymer, polyvinyl butyral, and nitro-cellulose are preferable. Further, the mean glass transition temperature (Tg) of polymer resin for the undercoat should be at least 25° C. and more preferably 25-200° C.

The crosslinking agent usable in the present invention for the undercoat layer can be any crosslinking agent. It can be, for example, multifunctional isocyanate and its derivative, melamine and its derivative, amino resin and its derivative, and so on. Among them, multifunctional isocyanate compounds are preferable as the crosslinking agent. Commercially available multifunctional isocyanate compounds are, for example, CORONATE HX and CORONATE 3041 produced by Nippon Polyurethane Industry Co. Ltd.

The undercoat layer can be formed on the support by the following method, for example.

First, this method prepares an undercoat layer coating liquid by adding a polymer resin and a crosslinking agent which are selected from the above to an adequate solvent, for example, a solvent which is used for preparation of a phosphor layer coating liquid (to be explained later) and fully mixing thereof.

The quantity of the crosslinking agent to be used is dependent upon the characteristics of a target radiation image conversion panel, raw materials for stimulable phosphor layers and the supports, and polymer resins for undercoat layers. To assure the adhesion of the stimulable phosphor layer to the support, the weight of the crosslinking agent should be at most 50% and preferably 15-50% by weight of the polymer resin.

The thickness of the undercoat layer is dependent upon the characteristics of a target radiation image conversion panel, raw materials for stimulable phosphor layers and the supports, and polymer resins for undercoat layers. Generally, the thickness should preferably be 3-50 μm and more preferably 5-40 μm.

Typical binders for the phosphor layer in the present invention are, for example, proteins (such as gelatine), polysaccharide (such as dextran), or natural polymer substances (such as gum arabic) and synthetic high polymer substances (such as polyvinyl butyral, polyvinyl acetate, nitrocellulose, ethylcellulose, vinylidenechloride-vinyl chloride copolymer, polyalkyl(meth)acrylate, vinyl chloride-vinylacetate copolymer, polyurethane, cellulose acetate butylate, polyvinyl alcohol, and linear polyester). However, it is preferable that the binder is a resin which contains thermoplastic elastomer as a main ingredient. Such thermoplastic elastomers are, for example, polystyrene-related, polyolefin-related, polyurethane-related, polyester-related, polyamide-related, polybutadiene-related, ethylene vinyl acetate related, polyvinyl chloride related, natural rubber related, fluorine rubber related, polyisoprene-related, chlorinated polyethylene related, styrene-butadiene rubber and silicone rubber related thermoplastic elastomers. Among the above thermoplastic elastomers, polyurethane- and polyester-related thermoplastic elastomers are preferable because they have a strong bonding force with phosphor, a good dispersibility, and a good ductility. They are preferable because they can increase the bending resistance of the sensitizing screen. Here, these binders can be cross-linked by proper crosslinking agents.

The mixing ratio of the binder and the stimulable phosphor in the coating liquid is dependent upon the haze ratio setting of the radiation image conversion panel, but preferably the binder should be 1-20 parts by weight and more preferably 2-10 parts by weight of the stimulable phosphor.

The radiation image conversion panel having a coated phosphor layer can be coated with a film for protection. Such films can be polyester, polymethacrylate, nitrocellulose film, and cellulose acetate films, each of which has an excitation-light absorption layer whose haze ratio is at least 5% and less than 60% measured by a method defined in ASTMD-1003. Drawn polyethylene terephthalate films and polyethylene naphthalate films are preferable as such protective films judging from film transparency and strength. Further, judging from moisture-proofing, the above films should preferably be coated with a metal oxide or silicon nitride film by vacuum evaporation.

The haze ratio of a film to be used for the protective layer can be easily controlled by the haze ratio of a resin film to be used. Industrial resin films of arbitrary haze ratios can be easily obtained. Usually, the protective film for the radiation image conversion panel must be optically very transparent. Various high-transparency plastic films having a haze ratio of 2-3% are also available commercially. To increase the advantageous effects of the present invention, the haze ratio of the film should be at least 5% and less than 60% and more preferably at least 10% and less than 50%. If the haze ratio is less than 5%, image irregularities and linear noises can be eliminates less effectively. If the haze ratio is at least 60%, the effect of image sharpness will be deteriorated.

The film usable for the protective layer can have an optimum moisture-proof property by laminating a plurality of resin films or deposited films on which metal oxide or the like is vapor-deposited according to the required moisture-proofing. To prevent deterioration of the stimulable phosphor by moisture absorption, the water vapor permeability of the protective film should be at most 5.0 g/m² a day. The resin film can be laminated by any known laminating method.

It is preferable to provide an excited-light absorbing layer between the laminated resin films in order to protect the phosphor plate against physical impacts and chemical deterioration. With this, the phosphor plate can keep its performance steadily for a long time. A plurality of excited-light absorbing layers can be provided. Further, a colored adhesive layer to laminate resin films can be used instead of the excited-light absorbing layer.

The protective film can be bonded to the stimulable phosphor layer by means of an adhesive layer. However, it is more preferable that the protective film is provided to cover and seal the phosphor surface. (This structure is also called a sealing structure.) The phosphor plate can be sealed by any known method. It is preferable to use a moisture-proof protective film whose outermost resin layer to be contact with the phosphor plate is made of a heat-sealing resin film. This facilitates sealing of the protective film to the phosphor plate and can increase the sealing efficiency. This is one of the preferred embodiments of the present invention. Further, it is preferable to sandwich the phosphor sheet between two moisture-proof protective films and heat-seal the protective film edges that run off the edges of the phosphor sheet by an impulse sealer or the like. This can prevent invasion of water into the phosphor sheet from its edges. Further it is preferable to use a laminated moisture-proof film containing one or more aluminum films instead of a moisture-proof protective film facing to the support surface. This aluminum-laminated film can completely prevent water invasion and facilitate sealing works. Furthermore, it is preferable to seal the protective films by the impulse sealer in a vacuum environment because this can prevent displacement of the phosphor sheet in the envelope of the protective films and exclude moisture from inside the envelope.

The outermost heat-sealing resin layer of the moisture-proof protective film which faces to the phosphor surface need not be bonded to the phosphor surface. "Not bonded to the phosphor surface" means that the phosphor surface is assumed to be optically and mechanically discontinuous to the moisture-proof protective film even when the phosphor surface is microscopically in point-contact with the protective film. Here, the above heat-sealing resin films indicate resin films that can be heat-sealed by a general-purpose impulse sealer. They can be, for example, ethylene vinyl acetate copolymer (EVA), polypropylene (PP), and polyethylene (PE) films.

Organic solvents usable for preparation of the phosphor layer coating liquid can be, for example, lower alcohols such as methanol, ethanol, isopropanol, and n-butanol; ketones such as acetone, methylethyl ketone, methyl isobutyl ketone, and cyclohexanon; esters of lower alcohol and lower fatty acid such as methyl acetate, ethyl acetate, and n-butyl acetate; ethers such as dioxane, ethylene glycol monoethyl ether, and ethylene glycol monomethyl ether; aromatic compounds such as triol and xylol; halogenated hydrocarbons such as methylene chloride and ethylene chloride; and their mixtures.

The coating liquid can contain various additives such as a dispersing agent to improve the dispersibility of particles in the coating liquid and a plasticizer to increase the binding force between the binder and phosphor particles in the prepared stimulable phosphor layer. Such dispersing agents can be, for example, phthalic acid, stearic acid, caproic acid, and oleophilic surfactant. Such plasticizers can be, for example, ester phosphates such as triphenyl phosphate, tricresyl phosphate, and diphenyl phosphate; ester phthalates such as diethyl phthalate and dimethoxy ethyl phthalate; ester glycolates such as ethyl phthalyl ethyl glycolate and butyl phthalyl butyl glycolate; and polyesters of polyethylene glycol and aliphatic dibasic acid such as polyester of triethylene glycol and adipic acid and polyester of diethylene glycol and succinic acid. Further, the stimulable phosphor layer coating liquid can contain a dispersing agent such as stearic acid, phthalic acid, caproic acid, and oleophilic surfactant to improve the dispersibility of stimulable phosphor particles.

A dispersing device such as a ball mill, bead mill, sand mill, a traiter, 3-roll mill, high-speed impeller disperser, Kady mill, ultrasonic disperser is used to prepare a coating liquid for the stimulable phosphor layer.

The coating liquid prepared by the above disperser is evenly applied to the surface of the support (to be explained later). A coating method can be a normal coating means such as Doctor Blade, roll coater, knife coater, comma coater, and lip coater.

The liquid layer coated onto the support by the above means is heated and dried. This is the stimulable phosphor layer formed on the support. The thickness of the stimulable phosphor layer is dependent upon the property of the target radiation image conversion panel, kind of the stimulable phosphor, mixing ratio of binder and phosphor, and so on. However, the layer thickness is usually 10-1,000 μm and preferably 10-500 μm.

EXAMPLE

Next, the present invention will now be described in detail referring to examples, but the present invention is not limited thereto.

(Particle A)

To synthesize an europium activated barium fluoroiodide stimulable phosphor precursor, 2500 ml of an aqueous $BaI_2$ solution (3.4 mol/l) was added to a pressure reaction vessel having two openings.

Further, 11 g of $EuI_3.H_2O$ and 110 g of potassium iodide were added to the aqueous solution.

Reaction mother liquid was maintained at 90° C. with stirring. Then, 1000 ml of aqueous ammonium fluoride solution (6 mol/liter) was added to the mother liquid employing a roller pump with blowing dry air at 10 liter/min to form precipitates. After completion of reaction, the weight ratio of solution between before and after flowing air was 0.94. Stirring continued for 90 minutes with maintaining the temperature as it was. Thereafter, filtration was conducted and washing was carried out with 2000 ml of ethanol.

(Calcination)

The following calcination was conducted by using the phosphor precursor prepared above.

Each phosphor precursor was treated by adding 1% by weight of ultra-fine alumina powder in order to prevent change in particle shapes by sintering and change in the particle size distribution due to inter-particle fusing, and fully stirring the mixture by a mixer to attach ultra-fine alumina powder evenly to the surfaces of the crystals. The resulting was placed in a quartz boat, and calcinated at 850° C. for 2 hours in the hydrogen gas atmosphere employing a tube furnace to obtain europium-activated barium fluoroiodide phosphor particles.

(Surface Treatment and Classification)

Next, after 100 grams of the resulting phosphor particles were immersed in an ethanol dispersion containing 2 grams of a silane coupling agent (γ-mercaptopropyltrimethoxy silane) to be slurry, the resulting was dried at 80° C. for 3 hours after filtration and mortar pulverization, and classified to prepare phosphor particles having an average particle diameter of 9 μm.

(Particle B)

To synthesize an europium activated barium fluoroiodide stimulable phosphor precursor, 2500 ml of an aqueous $BaI_2$ solution (3.4 mol/l) was added to a pressure reaction vessel having two openings.

Further, 11 g of $EuI_3.H_2O$, 110 g of $SrI_2.6H_2O$ and 300 g of potassium iodide were added to the aqueous solution.

Reaction mother liquid was maintained at 85° C. with stirring. Then, 1000 ml of aqueous ammonium fluoride solution (6 mol/liter) was added to the mother liquid employing a roller pump with blowing dry air at 10 liter/min to form precipitates. After completion of reaction, the weight ratio of solution between before and after flowing air was 0.94. Stirring continued for 90 minutes with maintaining the temperature as it was. Thereafter, filtration was conducted and washing was carried out with 2000 ml of ethanol.

After this, the same procedures under the same condition of the forgoing particle A were taken up to the classification to obtain a Sr content of 100 ppm and phosphor particles having an average particle of 4 μm. In addition, the Sr content was analyzed employing an inductively-coupled plasma atomic emission spectroscopy analyzer (SPS-4000, manufactured by Seiko Instruments Inc.). Unit (ppm) of the content is defined as weight ratio with respect to barium (mg/kg.Ba). Further, Eu content was also analyzed similarly to the Sr analysis method.

A luminescence intensity ratio of the above-described particle B to the above-described particle A (B/A) was 1.0. Incidentally, the luminescence intensity ratio is a value obtained from signal value A and signal value B each of the stimulated luminescence which were read out in a Regius 170 accuracy mode, utilizing the following equation, after each of radiation image conversion panel samples A (large particles) and B (small particles) was exposed to 200 mR X-rays at a bulb voltage of 80 kVp employing a Regius 170, manufactured by Konica Minolta Medical & graphic, Inc. Luminescence intensity ratio (small particles/large particles) $=10^{[(B-A)/1024]}$ Further, the quantities of $EuI_3.2H_2O$ and $SrI_2.6H_2O$ in the particles were adjusted to prepare particles (particle B) having the strontium content and the luminescence intensity ratio as shown in Table 1.

<Preparation of Radiation Image Conversion Panel (Sample Nos. 1-25)>

(Formation of Undercoat Layer)

An undercoat layer coating liquid was coated onto a foamed polyethylene terephthalate film (188E60L, produced by Toray Industries, Inc) having a thickness of 188 μm employing a doctor blade, and dried at 100° C. for 5 minutes to form an undercoat layer having a dry thickness of 30 μm.

(Undercoat Layer Coating Liquid)

Into 288.2 g of a dissolved polyester resin (VYLON 55SS, produced by Toyobo Co., Ltd. and a solid content of 35%), mixed were 0.34 g of dispersed β-copper phthalocyanine (a solid content of 35% and a pigment content of 30%) and 11.22 g of a polyisocyanate compound (CORONATE HX produced by Nippon Polyurethane Industry Co. Ltd.) as a hardener, and the system was dispersed with a propeller mixer to prepare a undercoat layer coating liquid.

(Preparation of Phosphor Layer Coating Liquid)

Hundred fifty grams of each of phosphor A and phosphor B prepared above and 52.63 g of a polyurethane resin (VYLON 630, produced by Nippon Polyurethane Industry Co. Ltd., a solid content of 30%, and a solvent of methylethylketone/toluene=5/5) were added into a mixed solvent of 0.13 g of methylethylketone, 0.13 g of toluene and 41.84 g of cyclohexane, and the system was dispersed with a propeller mixer to prepare a phosphor layer coating liquid.

(Preparation of Phosphor Layer and Phosphor Sheet)

On the undercoat layer formed above, coated was each coating liquid so as to have a thickness of 180 μm employing a doctor blade and dried at 100° C. for 15 minutes to form a phosphor layer and to prepare phosphor sheets 1-25.

(Preparation of Moisture-proof Protective Film)

Layer configuration (A) was used as a protective film on the phosphor layer-coated surface side of each of phosphor sheets 1-25 prepared above.

Layer Configuration (A)

NY15///VMPET12///VMPET12///PET12///CPP20 Where
NY: Nylon,
PET: Polyethylene terephthalate,
CPP: Casted polypropylene, and
VMPET: Alumina-deposited PET (commercially available, produced by Toyc Metalizing Co., Ltd.)

The number following the name of each resin film represents the resin layer thickness (in μm).

"///" represents a dry lamination adhesive layer of 3.0 μm in thickness. A two liquid reaction type urethane adhesive was used as an adhesive for the utilized dry lamination.

The protective film on the back side of each of phosphor sheets 1-25 is a dry lamination film composed of a 30 μm thick CPP film, a 9 μm thick aluminum film, and a 188 μm-thick polyethylene terephthalate (PET) film. Further, the adhesive layer has a thickness of 1.5 μm, and a two liquid reaction type urethane adhesive was used in this case.

(Preparation of Radiation Image Conversion Panels (Sample Nos. 1-29))

After the foregoing phosphor sheets 1-29 were each cut to a square, 20 cm on a side, the peripheral portion of each of them was fused and sealed by an impulse sealer under reduced pressure, employing the foregoing moisture-proof protective film to obtain radiation image conversion panels 1-29. The impulse sealer used in fusion employed a 3 mm wide heater.

Each of the above-described samples was evaluated as described below.

(X-Ray Damage)

(Evaluation of Luminance Degradation)

Amount of Stimulated Luminescence (PSL)

Luminance was measured employing a Regius 170, manufactured by Konica Minolta Medical & Graphic, Inc. After the radiation image conversion panels were each exposed to 200 mR X-rays at a bulb voltage of 80 kVp, a signal value of the stimulated luminescence which was read out in the Regius 170 accuracy mode was defined as luminance, whereby evaluation was made by calculating the luminance degradation ratio of a radiation image conversion panel with a compulsory degradation-treated sample, based on a radiation image conversion panel with a reference sample. The luminance degradation ratio was rated as shown below. In addition, the luminance degradation ratio is represented by the following equation, when a signal value of the compulsory degradation-treated sample and a signal value of the reference sample are designated as X and Y, respectively.

Luminance degradation ratio=$(1-10^{[(X-Y)/1024]}) \times 100\%$

5: Luminance degradation ratio of less than 2%
4: Luminance degradation ratio of at least 2% but less than 5%
3: Luminance degradation ratio of at least 5% but less than 10%
2: Luminance degradation ratio of at least 10% but less than 15%
1: Luminance degradation ratio of at least 15%

(Evaluation of Graininess)

In order to evaluate graininess of a radiation image conversion panel, the following X-ray exposure conditions were employed, and radiation images were subsequently read out in a Regius 170 accuracy mode employing Regius 170 manufactured by Konica Minolta Medical & Graphic, Inc. After reading them out, each of solid images exposed to X-ray, which was output on a film, was visually evaluated, and rated in 4 ranks as shown below.

X-ray exposure conditions: 80 kV, 200 mR and 0.1 sec.
Film output condition: γ (image contrast)=5.0 output.
5: No graininess is substantially observed; Excellent.
4: Graininess is slightly observed; Good.
3: Graininess is observed to a much greater degree.
2: Graininess is markedly observed.

TABLE 1

| Sample No. | *1 | Mixture ratio (Small particles/ Large particles) (% by weight) | Small particles Sr content (ppm) | Graininess | X-ray damage | Remarks |
| --- | --- | --- | --- | --- | --- | --- |
| 1 | 0.5 | 50/50 | 30 | 2 | 3 | Comp. |
| 2 | 0.5 | 50/50 | 50 | 2 | 4 | Comp. |
| 3 | 0.5 | 50/50 | 100 | 2 | 5 | Comp. |
| 4 | 0.5 | 50/50 | 200 | 2 | 5 | Comp. |
| 5 | 0.5 | 50/50 | 250 | 2 | 3 | Comp. |
| 6 | 0.8 | 50/50 | 30 | 4 | 3 | Inv. |
| 7 | 0.8 | 50/50 | 50 | 4 | 4 | Inv. |
| 8 | 0.8 | 50/50 | 100 | 4 | 5 | Inv. |
| 9 | 0.8 | 50/50 | 200 | 4 | 5 | Inv. |
| 10 | 0.8 | 50/50 | 250 | 4 | 3 | Inv. |
| 11 | 1.0 | 50/50 | 30 | 5 | 3 | Inv. |
| 12 | 1.0 | 50/50 | 50 | 5 | 4 | Inv. |
| 13 | 1.0 | 50/50 | 100 | 5 | 5 | Inv. |
| 14 | 1.0 | 50/50 | 200 | 5 | 5 | Inv. |
| 15 | 1.0 | 50/50 | 250 | 5 | 3 | Inv. |
| 16 | 1.2 | 50/50 | 30 | 4 | 3 | Inv. |
| 17 | 1.2 | 50/50 | 50 | 4 | 4 | Inv. |
| 18 | 1.2 | 50/50 | 100 | 4 | 5 | Inv. |
| 19 | 1.2 | 50/50 | 200 | 4 | 5 | Inv. |
| 20 | 1.2 | 50/50 | 250 | 4 | 3 | Inv. |
| 21 | 1.5 | 50/50 | 30 | 2 | 3 | Comp. |
| 22 | 1.5 | 50/50 | 50 | 2 | 4 | Comp. |
| 23 | 1.5 | 50/50 | 100 | 2 | 5 | Comp. |
| 24 | 1.5 | 50/50 | 200 | 2 | 5 | Comp. |
| 25 | 1.5 | 50/50 | 250 | 2 | 3 | Comp. |
| 26 | 1.0 | 100/0 | 100 | 2 | 2 | Comp. |
| 27 | 1.0 | 90/10 | 100 | 4 | 4 | Inv. |
| 13 | 1.0 | 50/50 | 100 | 5 | 5 | Inv. |
| 28 | 1.0 | 10/90 | 100 | 3 | 5 | Inv. |
| 29 | 1.0 | 0/100 | 100 | 1 | 5 | Comp. |

*1: Luminescence intensity ratio (Small particles/Large particles),
Inv.: Present invention and
Comp.: Comparative example As is clear from Table 1, it is to be understood that radiation image conversion panels exhibiting excellent properties such as excellent graininess and reduction of luminance degradation caused by X-ray damage can be provided by optimizing a luminescence intensity ratio and a mixture ratio of mixed particles, as well as a content of Sr (small particles).

POSSIBILITY OF INDUSTRIAL USE

Radiation image conversion panels of the present invention exhibit excellent effects such as excellent graininess and reduced luminance degradation (x-ray damage).

What is claimed is:

1. A radiation image conversion panel comprising a support and provided thereon, a stimulable phosphor layer containing a stimulable phosphor in a polymer resin,
wherein a luminescence intensity ratio of stimulable phosphor particles comprising a smallest average particle diameter to stimulable phosphor particles comprising a largest average particle diameter is 0.8-1.2,
provided that a total average particle diameter of all the stimulable phosphor particles is 3.0-10.0 μm, an average particle diameter of the stimulable phosphor particles comprising a smallest average particle diameter is 2.0-6.0 μm, an average particle diameter of the stimulable phosphor particles comprising a largest average particle diameter is 6-15 μm, and a content of the stimulable phosphor particles comprising a smallest average particle diameter or the stimulable phosphor particles comprising a largest average particle diameter is within the range of at least 10% by weight and at most 90% by weight, based on the total stimulable phosphor content.

2. The radiation image conversion panel of claim 1, wherein a content of Sr in the stimulable phosphor particles comprising a largest average particle diameter is 0.1-30 ppm, and a content of Sr in the stimulable phosphor comprising a smallest average particle diameter is 50-200 ppm.

3. The radiation image conversion panel of claim 1, wherein the stimulable phosphor layer comprises a mixture of two kinds of the stimulable phosphor particles having large average particle diameters and the stimulable phosphor particles having small average particle diameters.

4. The radiation image conversion panel of claim 2, wherein the stimulable phosphor layer comprises a mixture of two kinds of the stimulable phosphor particles having large average particle diameters and the stimulable phosphor particles having small average particle diameters.

5. The radiation image conversion panel of claim 1 comprising the stimulable phosphor represented by the following Formula (1)

$$Ba_{1-x}M^2_xFBr_yI_{1-y}:aM^1,bLn,cO \qquad \text{Formula (1)}$$

where $M^1$ is at least one alkali metal atom selected from the group consisting of Li, Na, K, Rb and Cs; $M^2$ is at least one alkaline earth metal atom selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and $0 \leq x \leq 0.3$, $0 \leq y \leq 0.3$, $0 \leq a \leq 0.05$, $0 < b \leq 0.2$ and $0 < c \leq 0.1$.